(12) United States Patent
Kilborn

(10) Patent No.: US 12,401,257 B1
(45) Date of Patent: Aug. 26, 2025

(54) DUAL ARMATURE SINGLE FIELD DC MOTOR/GENERATOR

(71) Applicant: Ronald Kilborn, Norfolk, VA (US)

(72) Inventor: Ronald Kilborn, Norfolk, VA (US)

(73) Assignee: Wilborn, LLC, Norfolk, VA (US)

( * ) Notice: Subject to any disclaimer, the term of this patent is extended or adjusted under 35 U.S.C. 154(b) by 325 days.

(21) Appl. No.: 18/142,085

(22) Filed: May 2, 2023

(51) Int. Cl.
*H02K 16/02* (2006.01)
*H02K 5/14* (2006.01)
*H02K 5/15* (2006.01)
*H02K 5/173* (2006.01)

(52) U.S. Cl.
CPC ............. *H02K 16/02* (2013.01); *H02K 5/148* (2013.01); *H02K 5/15* (2013.01); *H02K 5/1732* (2013.01)

(58) Field of Classification Search
CPC .......... H02K 16/02; H02K 5/148; H02K 5/15; H02K 5/1732
See application file for complete search history.

(56) References Cited

U.S. PATENT DOCUMENTS

| | | | |
|---|---|---|---|
| 5,283,492 A | 2/1994 | Mason | |
| 6,624,545 B1 * | 9/2003 | Furuse | H02K 16/02 310/114 |
| 7,400,077 B2 | 7/2008 | Caroon | |
| 7,843,094 B2 | 11/2010 | Goodzeit et al. | |
| 7,888,839 B2 | 2/2011 | Gabrys et al. | |
| 8,084,909 B2 | 12/2011 | Goodzeit et al. | |
| 2008/0161189 A1 | 7/2008 | Lewis et al. | |

FOREIGN PATENT DOCUMENTS

| | | |
|---|---|---|
| CN | 1652438 A | 12/2006 |
| CN | 101710769 | 5/2010 |
| CN | 108377076 | 8/2018 |
| FR | 2632791 A1 | 12/1989 |
| JP | 95031098 | 1/1995 |
| JP | 94178519 | 4/2011 |
| WO | 2017194352 | 11/2017 |
| WO | WO-2017194352 A1 * | 11/2017 |

OTHER PUBLICATIONS

WO-2017194352-A1, all pages (Year: 2017).*

* cited by examiner

*Primary Examiner* — Naishadh N Desai
(74) *Attorney, Agent, or Firm* — Shaddock Law Group, PC

(57) ABSTRACT

A dual armature single field DC motor/generator including at least some of a rotatable shaft maintained relative to a housing; an inner rotor armature secured to the rotatable shaft and including inner rotor armature electromagnets; field poles secured to the housing, each having a field pole electromagnet; interpoles secured to the housing, each having an interpole electromagnet; an inner rotor commutator assembly including an inner rotor commutator and inner rotor brush leads, wherein each inner rotor armature electromagnet is in electrical contact with a segment of the inner rotor commutator; an outer rotor armature secured to the rotatable shaft and including outer rotor armature electromagnets; and an outer rotor commutator assembly including an outer rotor commutator and outer rotor brush leads, wherein each of the outer rotor armature electromagnets in electrical contact with a segment of the outer rotor commutator.

20 Claims, 4 Drawing Sheets

DUAL ARMATURE SINGLE FIELD DC MOTOR/GENERATOR

CROSS-REFERENCE TO RELATED APPLICATIONS

None.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of electric motors and generators.

2. Description of Related Art

It is generally known to have Alternating Current (AC) electric motors or AC generators utilizing a single field and multiple armatures. This disclosure uses DC.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

The present disclosure describes a working prototype for a single field, dual armatures, Direct Current (DC) motor or DC generator (It may be used as either a motor or generator). The following terms are defined in their application to describe this embodiment.

Armatures: Each rotating armature consists of an electromagnet and a commutator. The electromagnet consists of iron core laminations and an electrical circuit, made up of copper wire coils and a commutator, which when energized, magnetizes the iron core. The commutator is the rotating electromagnet's electric power transfer point. It consists of a segmented copper ring which transfers power between the rotating armature and stationary carbon brushes. Leads attached to the stationary brushes allow electrical current to transfer to or from the rotating armature. The commutator segments allow armature current direction to be reversed as the armature coils traverse the stationary north and south field poles permitting rotational torque to continue in the same direction in a motor or production of a DC voltage in a generator.

Shunt Field Poles: Each field pole consists of a stationary electromagnet. Two or more field pole pairs are located diametrically opposite of each other and are mounted in a way that direct the fields magnetic flux to interact with both rotating armatures. They are electrically connected such that each pair creates a north and south pole. Their electric current is in parallel with the armature current to provide better control of the machine.

Interpoles: Each interpole consists of a stationary electromagnet. Two or more interpole pairs are located diametrically opposite of each other and are mounted in a way that direct the fields magnetic flux to interact with the rotating armatures. Their purpose is to ensure that commutation of the armature current occurs in the magnetic neutral plane between field poles, to minimize carbon brush arcing throughout the machines load range. They are electrically connected such that each pair creates a north and south pole. Their electric current is in series with the armature current.

The DC motor/generator in this disclosure provides an inner and outer DC armature mounted on a single shaft supported by one bearing on each end of the shaft. Fixed shunt field poles and interpoles are staggered radially in an air gap between the inner rotor armature and the outer rotor armature. The armatures may be externally connected for single, series, or parallel operation. The dual armature single field Direct Current (DC) motor/generator of the present disclosure may be operated as a DC generator or DC motor. The electromagnetic DC shunt field allows adjustable output voltage control when operated as a DC generator or enhanced adjustable speed control when operated as a DC motor.

By using two armatures, one radially inside the field poles and the other radially external to the field poles, the total magnetic flux linkage between the armatures and field poles is approximately double the flux used by a single armature representing a more efficient use of the field pole.

In certain exemplary, nonlimiting embodiments, The machine is forced air cooled using a shaft mounted cooling fan and a system of ducts and baffles. An optional water-cooled air cooler may be externally attached.

The separately excited stationary shunt field poles operate at a DC excitation current to produce a strong magnetic field in its aperture and external to the pole.

The reaction torque of the stationary field coil is transmitted by the field pole/interpole support to the housing of the DC motor/generator.

One end of the armature assembly rotatable shaft (Drive End) is generally provided with a high torque capacity coupling to transmit armature circuit mechanical power to or from an external device.

In certain exemplary, nonlimiting embodiments, the dual armature single field DC motor/generator of the present disclosure provides at least some of a housing; a shaft, wherein the rotatable shaft is maintained in an axial position relative to the housing by bearings; an inner rotor armature secured to the rotatable shaft; one or more field pole pairs,; one or more interpole pairs, wherein the field poles and the interpoles are each secured to the housing; inner and outer armature brush box assemblies containing stationary brushes to conduct DC current to or from the rotating armatures.

In certain exemplary, nonlimiting embodiments, either rolling element or sleeve bearings are attached or mounted in housing endplates to support the shaft.

In certain exemplary, nonlimiting embodiments, one or more brush access apertures are formed through the housing to allow access from the exterior of the housing to the inner or outer rotor commutator and brush box assemblies.

In certain exemplary, nonlimiting embodiments, each armature, field pole, and interpole windings are wound on separate laminated iron cores.

In certain exemplary, nonlimiting embodiments, the inner and outer rotor armatures are electrically coupled to a connection box on the exterior of the housing.

In certain exemplary, nonlimiting embodiments, the inner rotor armature and the outer rotor armature form substantially concentric circles around the rotatable shaft. The inner rotor armature is located inside the field poles and the interpoles, while the outer rotor armature is located outside the field poles and the interpoles.

In certain exemplary, nonlimiting embodiments, the number of the interpole pairs corresponds to a number of the field pole pairs.

In certain exemplary, nonlimiting embodiments, the inner rotor brush rigging assembly and the outer rotor brush rigging assembly are adjusted independently such that commutation occurs in the neutral plane on each rotor armature.

In certain exemplary, nonlimiting embodiments, the present disclosure separately and optionally provides a dual armature single field DC motor/generator that may be operated as a DC generator or DC motor.

The present disclosure separately and optionally provides a dual armature single field DC motor/generator that operates with only one bearing on each end of the shaft.

The present disclosure separately and optionally provides a dual armature single field DC motor/generator that does not require an external rectifier to convert armature Alternating Current (AC) to Direct Current (DC).

The present disclosure separately and optionally provides a dual armature single field DC motor/generator that, with both armatures connected in series, twice the power of single armature operation is required to rotate the generator and twice the generator output power is realized.

The present disclosure separately and optionally provides a dual armature single field DC motor/generator that uses commutators to reverse current in the armature coils, which allows us to use DC current directly on the armature without the need of slip rings to transfer AC power and external rectifiers to convert the AC to DC power.

The present disclosure separately and optionally provides a dual armature single field DC motor/generator that is easier and less expensive to manufacture and maintain.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures.

While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
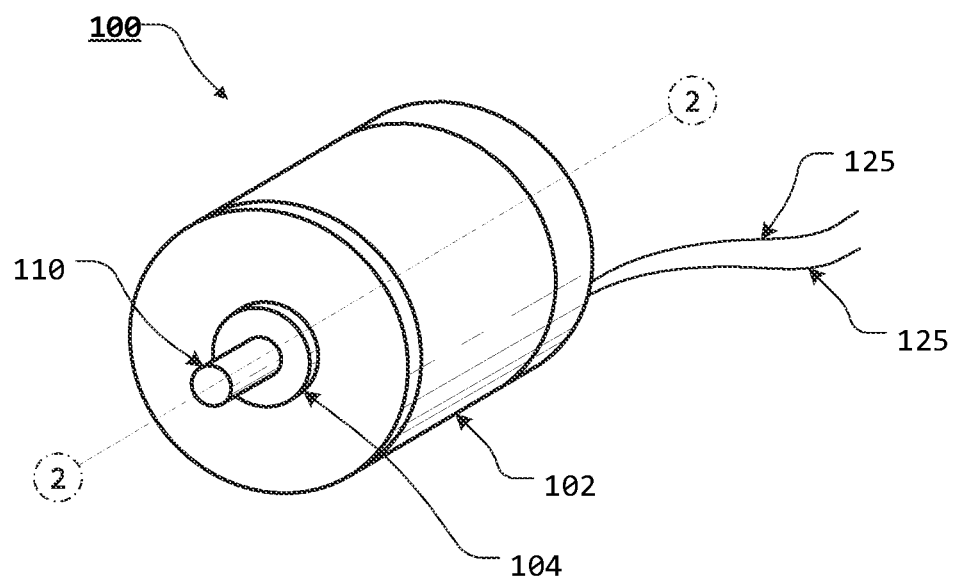
FIG. 1 illustrates a perspective view of certain exemplary components of an exemplary embodiment of a dual armature single field DC motor/generator, according to the present disclosure.

For simplicity and clarification, the design factors and operating principles of the dual armature single field DC motor/generator according to the present disclosure are explained with reference to various exemplary embodiments of a dual armature single field DC motor/generator according to the present disclosure. The basic explanation of the design factors and operating principles of the dual armature single field DC motor/generator is applicable for the understanding, design, and operation of the dual armature single field DC motor/generator of the present disclosure. It should be appreciated that the dual armature single field DC motor/generator can be adapted to many applications where a DC motor/generator can be used.

As used herein, the word "may" is meant to convey a permissive sense (i.e., meaning "having the potential to"), rather than a mandatory sense (i.e., meaning "must"). Unless stated otherwise, terms such as "first" and "second", "right" and "left", "top" and "bottom", "upper" and "lower", and "horizontal" and "vertical" are used to arbitrarily distinguish between the exemplary embodiments and/or elements such terms describe. Thus, these terms are not necessarily intended to indicate temporal or other prioritization of such exemplary embodiments and/or elements.

As used herein, and unless the context dictates otherwise, the term "coupled" is intended to include both direct coupling (in which two elements that are coupled to each other contact each other) and indirect coupling (in which at least one additional element is located between the two elements). The term coupled, as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that, for simplicity and clarification, certain embodiments of the present disclosure may be described using terms such as "front", "back", "rear", "right", "left", "upper", "lower", "outer", and/or "inner". However, it should be understood that these terms are merely used to aid in understanding of the present disclosure are not to be construed as limiting the systems, methods, devices, and/or apparatuses of the present disclosure. Additionally, it should be appreciated that, unless otherwise stated, the design factors and operating principles of the presently disclosed dual armature single field DC motor/generator may optionally be used in a "mirror image" assembly, wherein elements shown and/or described as being included in or on a drive end portion may optionally be included in or on a non-drive end portion. Alternatively, certain of the elements that are shown and/or described as being included in or on a back portion may optionally be included in or on a front portion, or vice versa.

It should also be appreciated that the terms "dual armature single field DC motor/generator", "dual armature", "single field", "DC motor", and "generator" are used for basic explanation and understanding of the operation of the systems, methods, and apparatuses of the present disclosure. Therefore, the terms "dual armature single field DC motor/generator", "dual armature", "single field", "DC motor", and "generator" are not to be construed as limiting the systems, methods, and apparatuses of the present disclosure.

Furthermore, it should be appreciated that, for simplicity and clarification, the embodiments of the present disclosure will be shown and/or described with reference to a certain number of leads being included on various portions of the dual armature single field DC motor/generator. However, it should be appreciated that the inclusion and/or specific placement of any number of leads is not essential to the dual armature single field DC motor/generator of the present disclosure.

Figure 2:
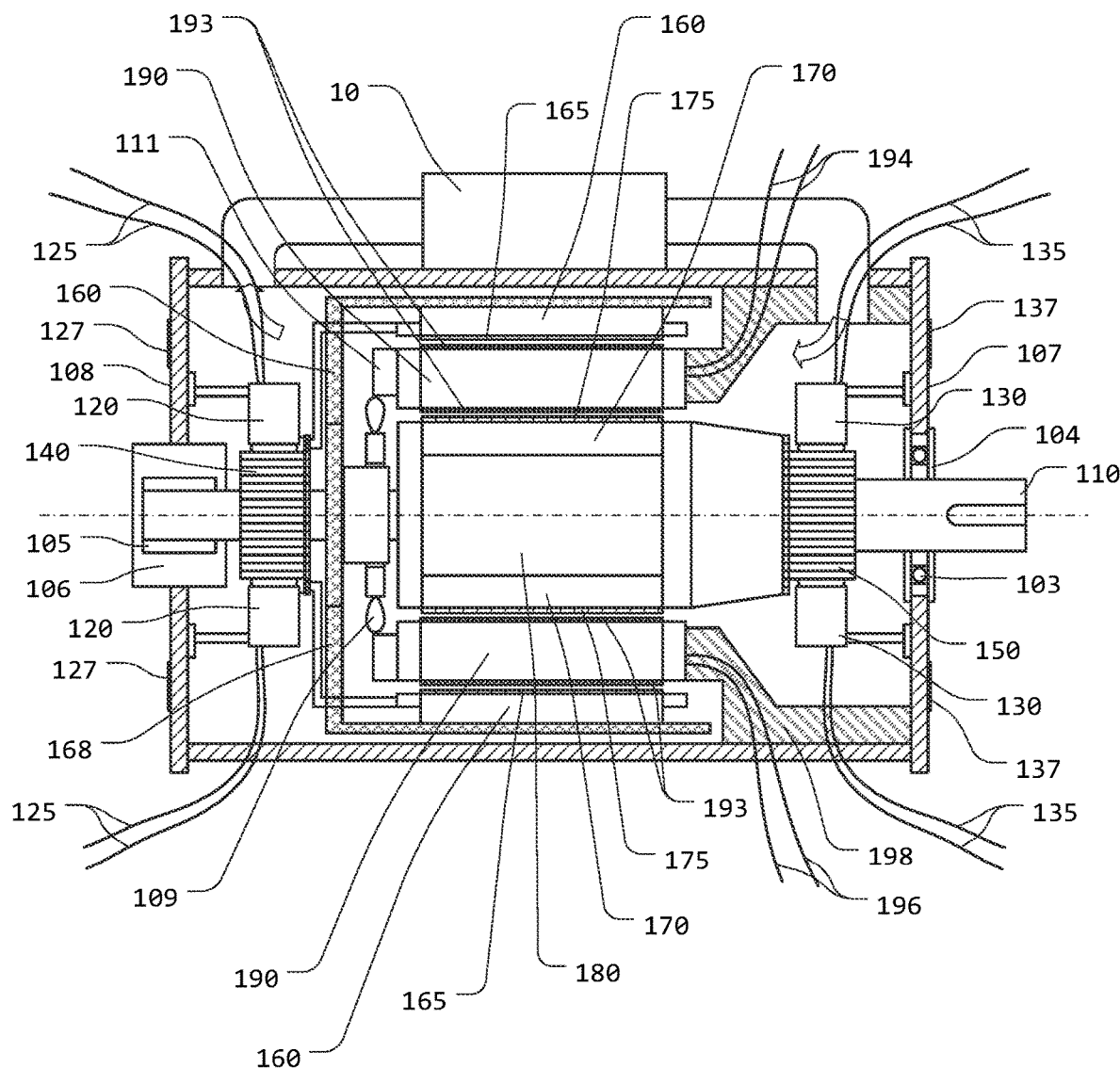
FIG. 2 illustrates a side cross-sectional view taken along line 2-2 of FIG. 1 Of certain exemplary components of an exemplary embodiment of a dual armature single field DC motor/generator, according to the present disclosure.
Figure 3:
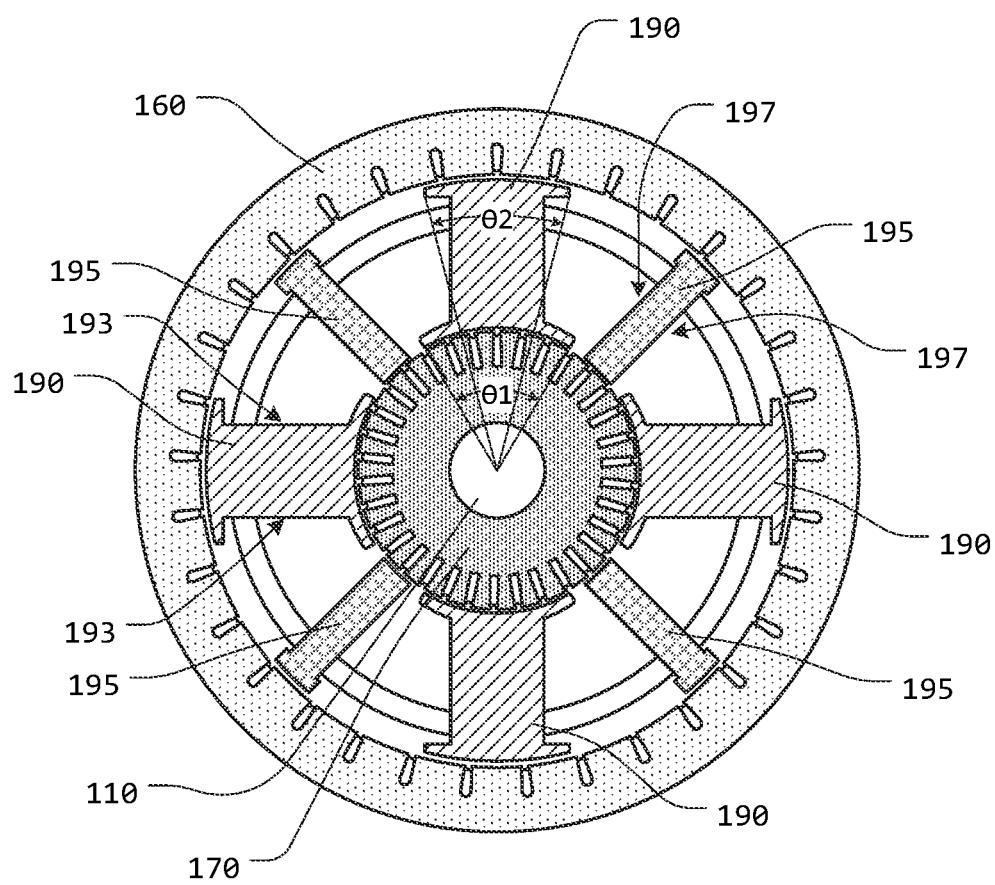
FIG. 3 illustrates front cross-sectional view of certain exemplary components of an exemplary embodiment of a dual armature single field DC motor/generator, according to an exemplary embodiment of the present disclosure.
Figure 4:
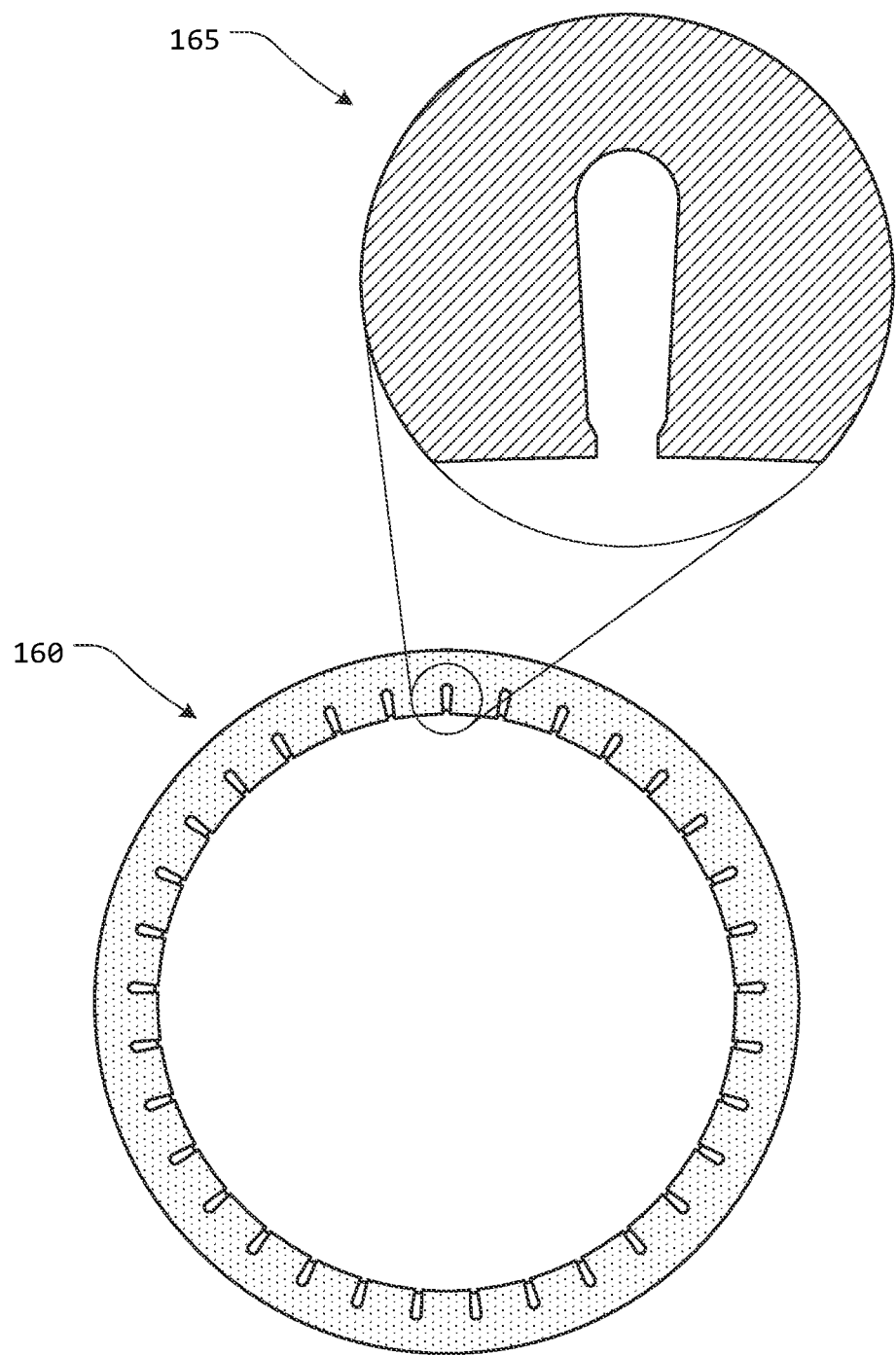
FIG. 4 illustrates a more detailed view of a portion of an exemplary outer rotor of an exemplary embodiment of a dual armature single field DC motor/generator, according to the present disclosure.

Turning now to the appended drawing figures, FIGS. 1-4 illustrate certain elements and/or aspects of an exemplary embodiment of a dual armature single field DC motor/generator, according to the present disclosure. As shown in FIGS. 1, 2, and 3 the DC motor/generator 100 comprises at least some of a housing 102, a rolling element bearing 103 with bearing retainers 104 or a bushing bearing 105 having a bushing bearing housing 106, a rotatable shaft 110, an outer rotor brush rigging assembly 120, outer rotor brush leads 125, one or more outer rotor brush apertures 127, an inner rotor brush rigging assembly 130, inner rotor brush leads 135, one or more inner rotor brush apertures 137, an outer rotor commutator 140, an inner rotor commutator 150, an outer rotor armature core 160 having an outer rotor armature winding 165, an inner rotor armature core 170 having an inner rotor armature winding 175, an inner rotor 180, a field pole cores 190 having a field pole windings 193, and an interpole cores 195 having an interpole winding 197.

In certain exemplary embodiments, brush access apertures 127 are formed through portions of the housing 102 to allow access from the exterior of the housing 102 to the outer rotor brush rigging assembly 120 and/or the inner rotor brush rigging assembly 130.

As illustrated, the DC motor/generator 100 comprises a rotatable shaft 110, which is maintained in a fixed, freely rotatable, axial position by bearing retainers 104 and rolling element bearings 103. In various exemplary embodiments, the shaft may be supported by babbit sleeve bearing assemblies 105 and 106 with or without thrust features. Rolling element bearings 103 may be ball or roller bearings, or any other suitable means capable of maintaining the rotatable shaft 110 in a fixed axial position which allows the rotatable shaft 110 to rotate in a conventional manner. The rolling element bearings 103 may optionally be grease or oil lubricated. The babbit sleeve bearings 105 will be oil lubricated The bearing retainers 104 or rolling element bearings 103 are attached or coupled to the housing endplates 107 and 108, such that the rotatable shaft 110 is maintained in an appropriate axial position relative to the housing 102 and is able to rotate relative to the housing 102.

In certain exemplary embodiments, a cooling fan 109 is attached or coupled to the rotatable shaft 110 and an air baffle 111 may be attached to the field pole assembly 190 to provide forced air cooling within at least a portion of the housing 102.

The outer rotor armature and the inner rotor armature are secured to the rotatable shaft 110. The outer rotor armature is secured to the rotatable shaft 110, via an outer rotor support 168. The field poles 190 and the interpoles 195 are secured to the housing endplate 107, via a field pole/interpole support 198.

The inner rotor armature and the outer rotor armature form substantially concentric circles around the rotatable shaft and are each secured to the rotatable shaft. The inner rotor armature is located inside the field poles and the interpoles, while the outer rotor armature is located outside the field poles and the interpoles.

All armature, interpole, and field pole cores are comprised of a plurality of insulated iron laminations.

Each of the inner rotor armature and the outer rotor armature comprises a series of coils, or toroidal windings, wound around each inner rotor core and each outer rotor core, respectively.

Each toroidal winding of the outer rotor armature 165 is in electrical contact with an appropriate section or segment of the outer rotor commutator 140. In various exemplary embodiments, the outer rotor brush rigging assembly 120 is electrically coupled to the appropriate, electrically conductive sections or segments of the outer rotor commutator 140 such that electrical current may be provided to the electrically conductive sections or segments of the outer rotor commutator 140.

The outer rotor brush rigging assembly 120 is electrically coupled to an appropriate current or power source by brush leads 125.

Similarly, each toroidal winding of the inner rotor armature 175 is in electrical contact with an appropriate section or segment of the inner rotor commutator 150, via the inner rotor commutator 150. In various exemplary embodiments, the inner rotor brush rigging assembly 130 is electrically coupled to the appropriate, electrically conductive sections or segments of the inner rotor commutator 150 such that electrical current may be provided to the electrically conductive sections or segments of the inner rotor commutator 150.

The inner rotor brush rigging assembly 130 is electrically coupled to an appropriate current or power source by brush leads 135.

The segments of the outer rotor commutator 140 are in electrical contact with the outer rotor brush rigging assembly 120 using presently known methods, which are understood and apparent to those skilled in the art. In various exemplary embodiments, the outer rotor brush rigging assembly 120 comprises metal or carbon, which makes electrical contact with the section(s) or segment(s) of the outer rotor commutator 140.

In this manner, each electrically conductive segment of the outer rotor commutator 140 may be in sequential electrical contact with an appropriate toroidal winding, via a corresponding brush lead 125.

Thus, as the rotatable shaft 110 is rotated, appropriate segments of the outer rotor commutator 140 are in sequential electrical contact with the outer rotor brush rigging assembly 120 and an appropriate current is provided to the toroidal windings of the outer rotor armature windings 165.

Similarly, as the rotatable shaft 110 is rotated, appropriate segments of the inner rotor commutator 150 are in sequential electrical contact with the inner rotor brush rigging assembly 130 and an appropriate current may be selectively provided to the toroidal windings of the inner rotor armature winding 175. Thus, However, it should be appreciated that in various exemplary embodiments, the inner rotor commutator 150 and the outer rotor commutator 140 are identical to one another and are phased independently so that each of the inner rotor commutator 150 and the outer rotor commutator 140 switches at its respective neutral plane. In various exemplary, nonlimiting embodiments, each of the inner rotor commutator 150 and the outer rotor commutator 140 has 99 bars and each rotor has 33 slots, each slot has 6 wires, 3 each from 2 overlapping coils wound in a wave pattern, and each commutator has 4 brushes.

The field poles 190 and the interpoles 195 are positioned at equally spaced apart locations from one another, forming a substantially concentric circle between the inner rotor armature 170 and the outer rotor armature 160. Each field pole 190 is positioned between two interpoles 195 and each interpoles 195 is positioned between two field poles 190. The number of field poles 190 corresponds to the number of interpoles 195.

Each field pole winding 193 is in electrical contact with an appropriate shunt field power source, via a respective one or more field pole leads 194. Similarly, each interpole winding 197 is in electrical contact with an appropriate armature current power source, via a respective one or more interpole leads 196.

Thus, an appropriate current may be selectively provided to the field pole windings 193 interpole windings 197.

It should be appreciated that, for simplicity and clarification, the embodiments of this DC motor/generator 100 are shown and/or described with reference to the DC motor/generator 100 having four field poles 190 and four interpoles 195. However, the number of field poles 190 and interpoles 195 of the DC motor/generator 100 is intended to be illustrative, not limiting. Thus, it should be understood that the number of field poles 190 and interpoles 195 of the DC motor/generator 100 may be varied and more or less than four field poles 190 and four interpoles 195 may be used, depending on, for example, the desired size of the DC motor/generator 100 or the specific application DC motor/generator 100 is to be used in.

As illustrated most clearly in FIG. 3, in certain exemplary, nonlimiting embodiments, the pole face of the inner rotor armature 170 spans 5 or 6 slots (⊖1 of approximately 61°) on the inner rotor armature 170 and only 3 slots (⊖2 of approximately 29°) on the outer rotor armature 160. It should be appreciated that this is exemplary and not limiting. Thus, the pole face of the inner rotor armature 170 may span any desired number of slots on the inner rotor armature 170 and slots on the outer rotor armature 160. In certain exemplary embodiments, the inner rotor armature 170 and the outer rotor armature 160 span the same angle to reduce commutator sparking and increased torque or, if used as a generator, induced voltage.

It should be appreciated that appropriate apertures are formed through one or more portions of the housing 102 so as to provide access to an inner region or portion of the of the DC motor/generator 100 to permit the passage of the various electrical leads.

A more detailed explanation of the instructions regarding how to provide current and/or power to the DC motor/generator 100 and/or receive generated current and/or power from the DC motor/generator 100 is not provided herein because it is believed that the level of description provided herein is sufficient to enable one of ordinary skill in the art to understand and practice the systems, methods, and apparatuses, as described.

In certain exemplary, nonlimiting embodiments, the DC motor/generator 100 can be used as a diesel driven DC generator suitable for generating marine propulsion power.

In certain exemplary, nonlimiting embodiments, the DC motor/generator 100 can be used as a wind driven DC generator.

In certain exemplary, nonlimiting embodiments, the DC motor/generator 100 can be used as a DC motor for marine or land vehicle propulsion and other high reliability requirements.

In certain exemplary, nonlimiting embodiments, the DC motor/generator 100 permits quiet, reliable, variable speed, reversible, high torque, high power operation.

In certain exemplary, nonlimiting embodiments, the two rotating, wave wound, outer rotor armature 160 and inner rotor armature 170 are located with one armature adjacent to each pole of a single field. Flux linkage is provided by the metal encased DC motor/generator 100.

In certain exemplary, nonlimiting embodiments, the fixed, wound, shunt field poles 190 permit output voltage control when used as a DC generator.

In certain exemplary, nonlimiting embodiments, the fixed, wound, shunt field poles 190 permit speed control when used as a DC motor/generator.

In certain exemplary, nonlimiting embodiments, the inner rotor armature and outer rotor armature assemblies have their own independent commutators, and brush rigging assemblies for the direct transfer of DC armature current.

In certain exemplary, nonlimiting embodiments, external switchgear could be used to, locally or remotely, reverse direction of a DC motor/generator.

In certain exemplary, nonlimiting embodiments, because the inner rotor armature 170 and the outer rotor armature 160 operate independently of each other, external switchgear could be used to, locally or remotely, to isolate one of the armatures. This allows continued operation at 50% power in the event of one faulty armature.

Two concentric rotors on one rotatable shaft 110 allows the use of two instead of four bearings supporting the inner rotor armature 170 and the outer rotor armature 160. Minimizing the number of bearings in a two-armature motor/generator reduces the possibility of having a bearing failure.

In various exemplary, nonlimiting embodiments, the armature and field coil field pole electromagnet 193 and interpole electromagnet 197 use copper conductor materials. There are no permanent magnets. Exotic materials containing rare earth elements are not required for this DC motor/generator 100.

In various exemplary, nonlimiting embodiments, the armature and field coils are Vacuum Pressure Impregnated with high reliability insulating epoxy.

For certain DC motor/generators 100, internal forced air flow can be ducted to an external air cooler for the efficient removal of heat generated by inherent electrical machine power losses.

While the present disclosure has been described in conjunction with the exemplary embodiments outlined above, the foregoing description of exemplary embodiments of the present disclosure, as set forth above, are intended to be illustrative, not limiting and the fundamental disclosed systems, methods, and/or apparatuses should not be considered to be necessarily so constrained. It is evident that the present disclosure is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A dual armature single field Direct Current (DC) motor/generator, comprising:
    a housing;
    a rotatable shaft, wherein said rotatable shaft is maintained in a rotatable, axial position relative to said housing;
    an inner rotor armature secured to said rotatable shaft, wherein said inner rotor armature includes one or more inner rotor armature electromagnets;
    one or more field poles, each of said one or more field poles having a field pole electromagnet;
    one or more interpoles, each of said one or more interpoles having an interpole electromagnet, wherein said field poles and said interpoles are each secured to said housing;
    an inner rotor commutator assembly including an inner rotor commutator and one or more inner rotor brush leads, wherein each of said inner rotor armature electromagnets is in electrical contact with an appropriate segment of said inner rotor commutator, via said inner rotor commutator assembly, such that an electrical current may be selectively provided to said electrically conductive segments of said inner rotor commutator;
    an outer rotor armature secured to said rotatable shaft, wherein said outer rotor armature includes one or more outer rotor armature electromagnets; and
    an outer rotor commutator assembly including an outer rotor commutator and one or more outer rotor brush leads, wherein each of said outer rotor armature electromagnets is in electrical contact with an appropriate segment of said outer rotor commutator, via said outer rotor commutator assembly, such that an electrical current may be selectively provided to said electrically conductive segments of said outer rotor commutator.

2. The Direct Current (DC) motor/generator of claim 1, wherein said bearing retainers or rolling element bearings are attached or coupled to housing endplates of said housing.

3. The Direct Current (DC) motor/generator of claim 1, wherein one or more brush access apertures are formed through said housing to allow access from said exterior of said housing to said outer rotor commutator assembly and/or said inner rotor commutator assembly.

4. The Direct Current (DC) motor/generator of claim 1, wherein said dual armature single field Direct Current (DC) motor/generator is used as a diesel driven Direct Current (DC) generator.

5. The Direct Current (DC) motor/generator of claim 1, said dual armature single field Direct Current (DC) motor/generator is used as a wind driven Direct Current (DC) generator.

6. The Direct Current (DC) motor/generator of claim 1, wherein said field pole electromagnet and said interpole electromagnets comprise copper conductor materials.

7. The Direct Current (DC) motor/generator of claim 1, wherein each of said inner rotor armature electromagnets comprises a series of coils or toroidal windings, wound around each of said inner rotor armatures.

8. The Direct Current (DC) motor/generator of claim 1, wherein each of said outer rotor armature electromagnets comprises a series of coils or toroidal windings, wound around each of said outer rotor armatures.

9. The Direct Current (DC) motor/generator of claim 1, wherein said outer rotor commutator assembly is electrically coupled to an appropriate current or power source, via one or more brush leads.

10. The Direct Current (DC) motor/generator of claim 1, wherein said inner rotor commutator assembly is electrically coupled to an appropriate current or power source, via one or more brush leads.

11. The Direct Current (DC) motor/generator of claim 1, wherein said inner rotor armature, said outer rotor armature, and said field poles are vacuum pressure impregnated with high reliability insulating epoxy.

12. The Direct Current (DC) motor/generator of claim 1, wherein said inner rotor armature is located inside said field poles and said interpoles, while said outer rotor armature is located outside said field poles and said interpoles.

13. The Direct Current (DC) motor/generator of claim 1, wherein each electrically conductive segment of said outer rotor commutator may be in sequential electrical contact with an appropriate portion of said outer rotor armature electromagnets, via a corresponding brush lead, such that as said rotatable shaft is rotated, appropriate segments of said outer rotor commutator are in sequential electrical contact with said outer rotor commutator assembly and an appropriate current is provided to said appropriate portion of said outer rotor armature electromagnets.

14. The Direct Current (DC) motor/generator of claim 1, wherein each electrically conductive segment of said inner rotor commutator may be in sequential electrical contact with an appropriate portion of said inner rotor armature electromagnets, via a corresponding brush lead, such that as said rotatable shaft is rotated, appropriate segments of said inner rotor commutator are in sequential electrical contact with said inner rotor commutator assembly and an appropriate current may be selectively provided to said appropriate portion of said inner rotor armature electromagnets.

15. The Direct Current (DC) motor/generator of claim 1, wherein a number of said field poles corresponds to a number of said interpoles.

16. The Direct Current (DC) motor/generator of claim 1, wherein an electromagnetic Direct Current (DC) shunt field provides adjustable output voltage control if said dual armature single field Direct Current (DC) motor/generator is operated as a Direct Current (DC) generator.

17. The Direct Current (DC) motor/generator of claim 1, wherein an electromagnetic Direct Current (DC) shunt field provides enhanced adjustable speed control if said dual armature single field Direct Current (DC) motor/generator is operated as a Direct Current (DC) motor.

18. The Direct Current (DC) motor/generator of claim 1, wherein said inner rotor commutator and said outer rotor commutator are phased independently such that each of said inner rotor commutator and said outer rotor commutator switches at a respective neutral plane.

19. A dual armature single field Direct Current (DC) motor/generator, comprising:
a rotatable shaft maintained in a rotatable, axial position relative to a housing;
an inner rotor armature secured to said rotatable shaft, wherein said inner rotor armature includes one or more inner rotor armature electromagnets;
one or more field poles, each of said one or more field poles having a field pole electromagnet;
one or more interpoles, each of said one or more interpoles having an interpole electromagnet, wherein said field poles and said interpoles are each secured to said housing;
an inner rotor commutator assembly including an inner rotor commutator and one or more inner rotor brush leads, wherein each of said inner rotor armature electromagnets is in electrical contact with an appropriate segment of said inner rotor commutator, via said inner rotor commutator assembly, such that an electrical current may be selectively provided to said electrically conductive segments of said inner rotor commutator;
an outer rotor armature secured to said rotatable shaft, wherein said outer rotor armature includes one or more outer rotor armature electromagnets; and
an outer rotor commutator assembly including an outer rotor commutator and one or more outer rotor brush leads, wherein each of said outer rotor armature electromagnets is in electrical contact with an appropriate segment of said outer rotor commutator, via said outer rotor commutator assembly, such that an electrical current may be selectively provided to said electrically conductive segments of said outer rotor commutator;
wherein if an appropriate amount of an electrical current is selectively provided to said field pole electromagnet and said interpole electromagnet of said field poles and said interpoles, magnetic flux lines extend from said field poles and said interpoles to affect said inner rotor armature electromagnet of said inner rotor armature to create a first magnetic circuit between said field poles and said interpoles and said inner rotor armature;
wherein if an appropriate amount of an electrical current is selectively provided to said field poles and said interpoles, magnetic flux lines extend from said field poles and said interpoles to affect said outer rotor armature electromagnet to create a second magnetic circuit between said field poles and said interpoles and said outer rotor armature;
wherein if an appropriate amount of an electrical current is selectively provided to said outer rotor armature electromagnet, magnetic flux lines extend from said outer rotor armature to affect said field pole electromagnet and said interpole electromagnet of said field poles and said interpoles to create a third magnetic circuit between said outer rotor armature and said field poles and said interpoles; and wherein if an appropriate amount of an electrical current is selectively provided to said inner rotor armature electromagnet, magnetic flux lines extend from said inner rotor armature to affect said field pole electromagnet and said interpole electromagnet of said field poles and said interpoles to create a fourth magnetic circuit between said inner rotor armature and said field poles and said interpoles.

20. A dual armature single field Direct Current (DC) motor/generator, comprising:

a rotatable shaft maintained in a rotatable, axial position relative to a housing;

an inner rotor armature secured to said rotatable shaft, wherein said inner rotor armature includes one or more inner rotor armature electromagnets;

one or more field poles, each of said one or more field poles having a field pole electromagnet;

one or more interpoles, each of said one or more interpoles having an interpole electromagnet, wherein said field poles and said interpoles are each secured to said housing;

an inner rotor commutator assembly including an inner rotor commutator and one or more inner rotor brush leads, wherein each of said inner rotor armature electromagnets is in electrical contact with an appropriate segment of said inner rotor commutator, via said inner rotor commutator assembly, such that an electrical current may be selectively provided to said electrically conductive segments of said inner rotor commutator;

an outer rotor armature secured to said rotatable shaft, wherein said outer rotor armature includes one or more outer rotor armature electromagnets; and an outer rotor commutator assembly including an outer rotor commutator and one or more outer rotor brush leads, wherein each of said outer rotor armature electromagnets is in electrical contact with an appropriate segment of said outer rotor commutator, via said outer rotor commutator assembly, such that an electrical current may be selectively provided to said electrically conductive segments of said outer rotor commutator;

wherein if an appropriate amount of an electrical current is selectively provided to said field pole electromagnet and said interpole electromagnet of said field poles and said interpoles, magnetic flux lines extend from said field poles and said interpoles to affect said inner rotor armature electromagnet of said inner rotor armature;

wherein if an appropriate amount of an electrical current is selectively provided to said field poles and said interpoles, magnetic flux lines extend from said field poles and said interpoles to affect said outer rotor armature electromagnet;

wherein if an appropriate amount of an electrical current is selectively provided to said outer rotor armature electromagnet, magnetic flux lines extend from said outer rotor armature to affect said field pole electromagnet and said interpole electromagnet of said field poles and said interpoles; and wherein if an appropriate amount of an electrical current is selectively provided to said inner rotor armature electromagnet, magnetic flux lines extend from said inner rotor armature to affect said field pole electromagnet and said interpole electromagnet of said field poles and said interpoles.

\* \* \* \* \*